(12) United States Patent
Miyazaki et al.

(10) Patent No.: US 11,052,479 B2
(45) Date of Patent: Jul. 6, 2021

(54) SOLDERING DEVICE CONTROL METHOD AND APPARATUS

(71) Applicant: Hakko Corporation, Osaka (JP)

(72) Inventors: Mitsuhiko Miyazaki, Osaka (JP); Yasumasa Igi, Osaka (JP); Nobuharu Boh, Osaka (JP)

(73) Assignee: HAKKO CORP., Osaka (JP)

( * ) Notice: Subject to any disclaimer, the term of this patent is extended or adjusted under 35 U.S.C. 154(b) by 108 days.

(21) Appl. No.: 16/174,414

(22) Filed: Oct. 30, 2018

(65) Prior Publication Data

US 2020/0130085 A1 Apr. 30, 2020

(51) Int. Cl.
    *G05B 15/02* (2006.01)
    *B23K 3/03* (2006.01)

(52) U.S. Cl.
    CPC .............. *B23K 3/033* (2013.01); *G05B 15/02* (2013.01)

(58) Field of Classification Search
    None
    See application file for complete search history.

(56) References Cited

U.S. PATENT DOCUMENTS

| | | | | |
|---|---|---|---|---|
| 2004/0195292 | A1* | 10/2004 | Tetuo | B23K 3/033 228/51 |
| 2009/0313549 | A1* | 12/2009 | Casner | G05B 15/02 715/740 |
| 2010/0258554 | A1* | 10/2010 | Miyazaki | B23K 3/03 219/616 |
| 2014/0277684 | A1* | 9/2014 | Lamers | B23K 9/0953 700/145 |
| 2019/0047066 | A1* | 2/2019 | Matsuzaki | B23K 3/0346 |
| 2019/0104659 | A1* | 4/2019 | Teraoka | B23K 3/033 |
| 2019/0126375 | A1 | 5/2019 | Alletzhaeusser et al. | |
| 2019/0364668 | A1* | 11/2019 | Nguyen | B23K 3/0353 |

FOREIGN PATENT DOCUMENTS

WO  WO2018198838  11/2018

\* cited by examiner

*Primary Examiner* — Ryan A Jarrett
(74) *Attorney, Agent, or Firm* — David B Abel

(57) ABSTRACT

A smartphone, tablet or mobile computer based soldering system control method and apparatus to allow a user or supervisor of users to monitor and control the operating parameters of soldering devices or measuring device. The control method and apparatus has features for cartridge management, temperature calibration and control, user performance and wireless interactive control. The control method may interactively control soldering devices connected directly to a power supply and optionally soldering device components of a soldering system that includes a control station to provide power to the soldering device.

5 Claims, 9 Drawing Sheets

SOLDERING DEVICE CONTROL METHOD AND APPARATUS

BACKGROUND OF THE INVENTION

In the electronics industry the task of soldering electronic components is often a manual operation. The soldering function is performed by setting the work area on a work bench. The worker will operate the soldering device facing the work area. The soldering devices may include soldering irons, de-soldering irons, and tweezers but they are not limited thereto. The individual soldering device may be connected to an AC power supply or the soldering device may require connection to a power supply control station. The soldering device itself or the power supply control station controls the heat generation of the soldering device mainly by adjusting the power applied to the heater of the soldering device.

Conventional soldering irons that connect directly to a power supply generally do not include temperature setting and temperature control functionality. The soldering device is plugged in, activated by an "on" switch or button, and the power is delivered to the heater as long as the soldering device is "on". Some more recent AC powered soldering devices such as for example the HAKKO FX-600 Soldering Iron include control electronics to allow a user to select a desired temperature, for example in the range from 200° C. to 500° C. By comparison, soldering devices that are powered by a power supply control station have enhanced functionality to allow the temperature to be set within an appropriate range and include feedback control to maintain the temperature during a soldering process. The control station generally includes a power supply portion supplying power to the soldering device, a power supply control portion controlling the power output from the power supply portion, a temperature setting portion for inputting a set temperature which is the control target of the power supply control section, a display for displaying the setting information of the temperature setting portion, and a housing for housing or enclosing the circuitry. The worker or operator operates the temperature setting portion while viewing the information displayed on the display. This operation includes a process to update or set the setting information to the temperature setting portion. The setting information is information related to conditions for determining the set temperature of the soldering device as well as the physical characteristics of the work to be soldered.

In industrial applications, the same set of soldering functions may be carried out by the worker, while a supervisor may impose conditions on the soldering operations to promote efficiency and uniformity. For example, the supervisor may set a maximum operating temperature for the soldering device or power supply control device to prevent overheating of the work during the soldering operations.

BRIEF SUMMARY OF THE INVENTION

The present invention is directed to a method and apparatus for allowing a user and a supervisor to monitor and control the operation of the soldering devices or soldering systems using a smartphone, tablet or portable computing device, collectively herein the smart device. The smart device is programmed with an application (or app) and includes or is augmented with wireless communication technology and a scanner. The wireless communication technology may include Bluetooth, infrared, or radio frequency communication technology. The smart device uses the wireless communication technology to communicate with the soldering device or soldering system control station, heating tools which may comprise a handle and multiple interchangeable cartridges, sensor equipment for example a temperature sensor, and a host or server via an intranet or the internet. The smart device is interactive with the control station to allow the user or a supervisor to monitor and control the operational parameters of the soldering heating tools, and provide cartridge management, temperature calibration and control, user performance and wireless interactive control.

DETAILED DESCRIPTION OF THE INVENTION

Figure 1:
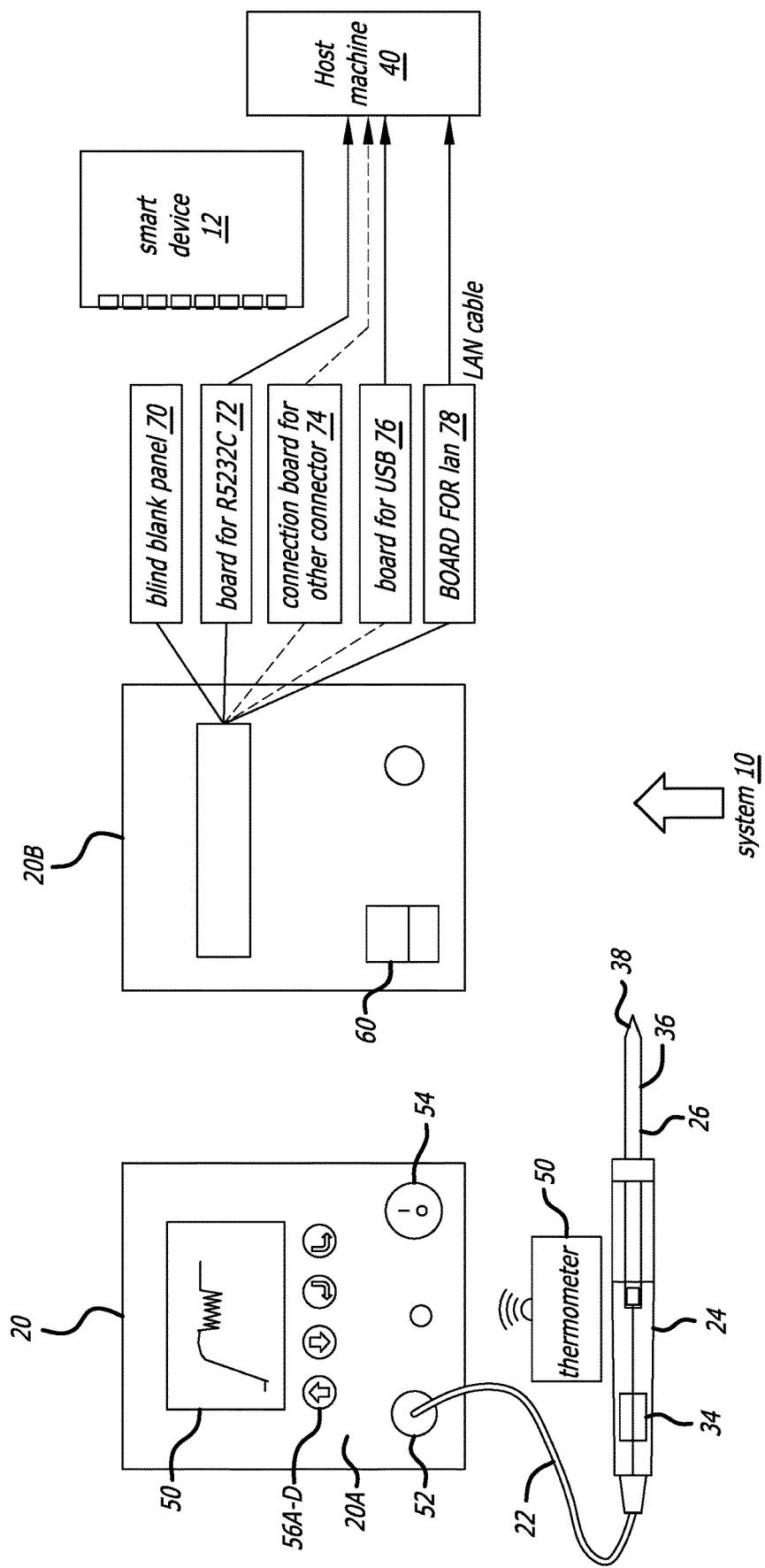
FIG. 1 provides a block and schematic depiction of a soldering system and smart device controller of the present invention.

FIG. 1 provides a block and schematic depiction of a soldering system 10 augmented with a smart device 12 according to the present invention. The soldering system 10 is configured around a control station 20, which is connected via a cable assembly 22 to a handle 24 and cartridge 26. The control station 20 provides control signals and power to the cartridge 26, which an operator uses to carry out the soldering or de-soldering operations. The control station 20 is adapted to include circuitry allowing wireless communication with the smart device 12 and either directly or via the smart device 12 to a host machine 40, as well as a temperature sensor, for example a thermometer 50. The host machine 40 may be a component of a protected intranet system, and it may alternatively be connected to the internet.

The control station 20 has a front panel 20A and a rear panel 20B, depicted side by side in FIG. 1. On the front panel 20A, the control station 20 has a display 50, for example a liquid crystal display (LCD), although other displays for example a light emitting diode (LED) display may be used. The front panel 20A also includes a socket 52 allowing connection to the cable assembly 22, and a power switch 54 for powering the control station 20 on and off. The front panel 20A also includes a number of control or data entry components, depicted as buttons 56A, 56B, 56C, and 56D. It may be appreciated that the data entry components may be any number of electrical components including for example push buttons, toggle switches, knobs, dials, and touch or optical sensors.

The rear panel 20B of the control station 20 includes a power socket 60, and at least one connection board slot 62. FIG. 1 schematically depicts various items that may be affixed to the connection board slot 62, including for example a cover panel 70, an RS232C circuit board 72, a wireless connection board 74, a USB connector board 76 and a LAN board 78. Each of these boards 72, 74, 76 and 78 may be used with appropriate wireless connectivity to interconnect the control station 20 to the smart device 12 or the host machine 40.

FIG. 1 also schematically depicts the handle 24 securing the cartridge 26. The handle 24 may include a memory element 34, for example a PROM, EPROM or EEPROM. The memory element 34 may be used to store information specific to the type of cartridge 26 inserted into the handle 24. The information may include data that cannot be changed (fixed data) and it may store information that is written to the memory element 34 by or via the control station 20 (variable data). The fixed data may include for example a cartridge serial number, tip shape data, and factory set temperature data for each cartridge. The variable data may include programmed set temperature data, temperature offset values, applied load counts, totaled powered time, total solder operations, and any use with leaded solder. Applied load counts may account for non-solder operations (thus a number higher than total solder operations) or it could be a total on powered time.

In the preferred embodiment, each of the components of the soldering system, including each of the various cartridges 26, are provided with a Quick Response Code ("QR Code") type of matrix barcode to uniquely identify each component. The cartridge 26 includes an integrated heater/sensor 36 and a soldering tip 38. The soldering system 10 contemplates accommodating multiple different types and styles of soldering and de-soldering cartridges, having any number of known tip designs.

Figure 2:
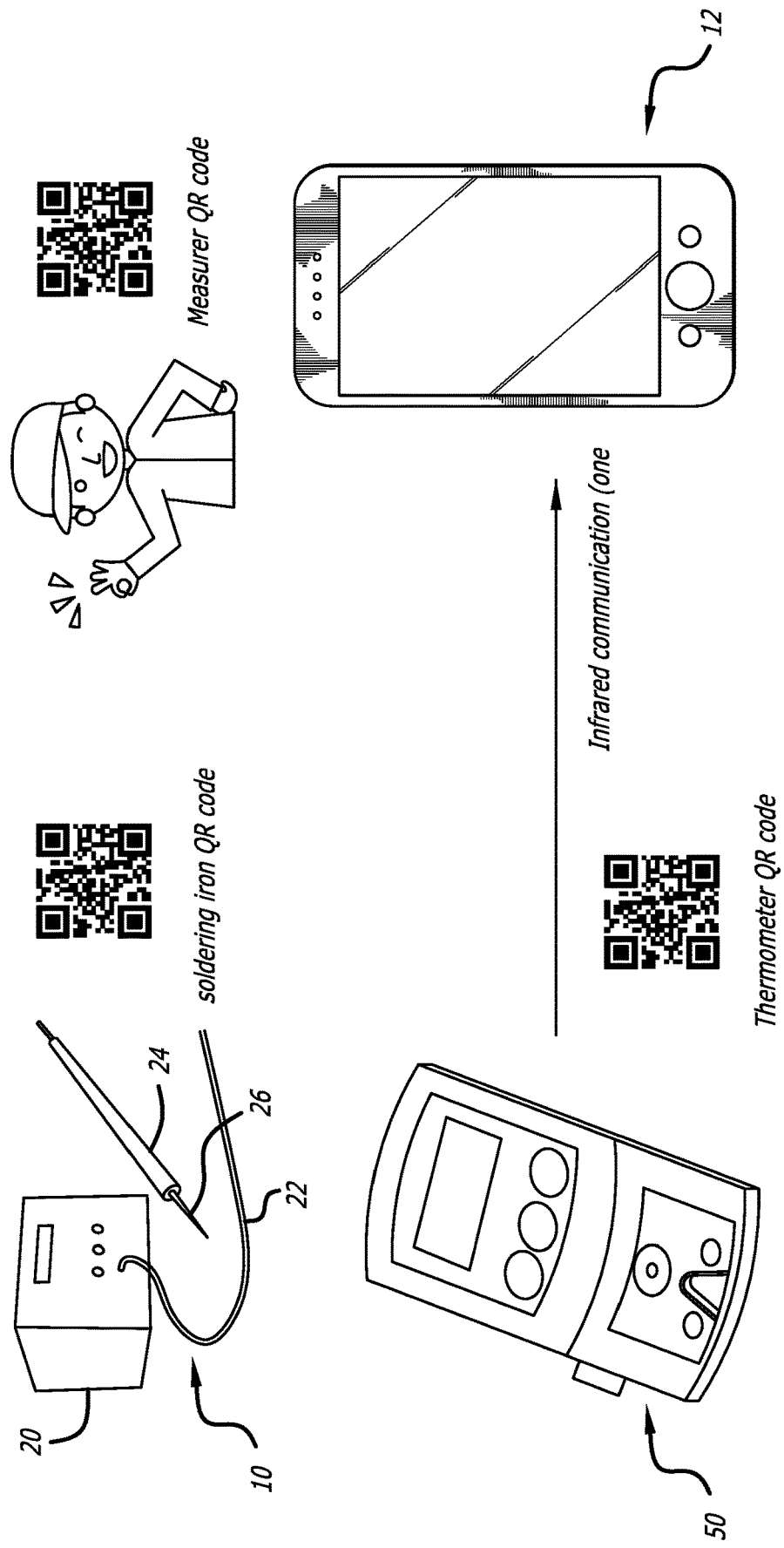
FIG. 2 provides a schematic depiction of the operation of the smart device by a user to control the soldering system of FIG. 1.

FIG. 2 provides a box diagram schematic depiction of the interaction of the smart device 12 and the soldering system 10. The smart device 12 will initially be programmed with a downloadable software program application, or hereinafter the "App." The App will include generate an icon on the home screen of the smart device 12 to allow a user to initiate or start the App. The user initiates the App on the smart device 12, and then uses the smart device 12 to read the QR Codes associated with the control station 20, thermometer 50, and the operator/user or the associated workstation. After reading the QR Codes for the control station 20 and the thermometer 50, the smart device establishes a wireless communication link to each device, allowing the smart device to receive temperature measurement signals from the thermometer 50 and control data from the control station 20. The smart device 12 then displays the received information, allowing the user of the smart device 12 to initiate programmed interaction with the control station, as described in more detail below.

Figure 3:
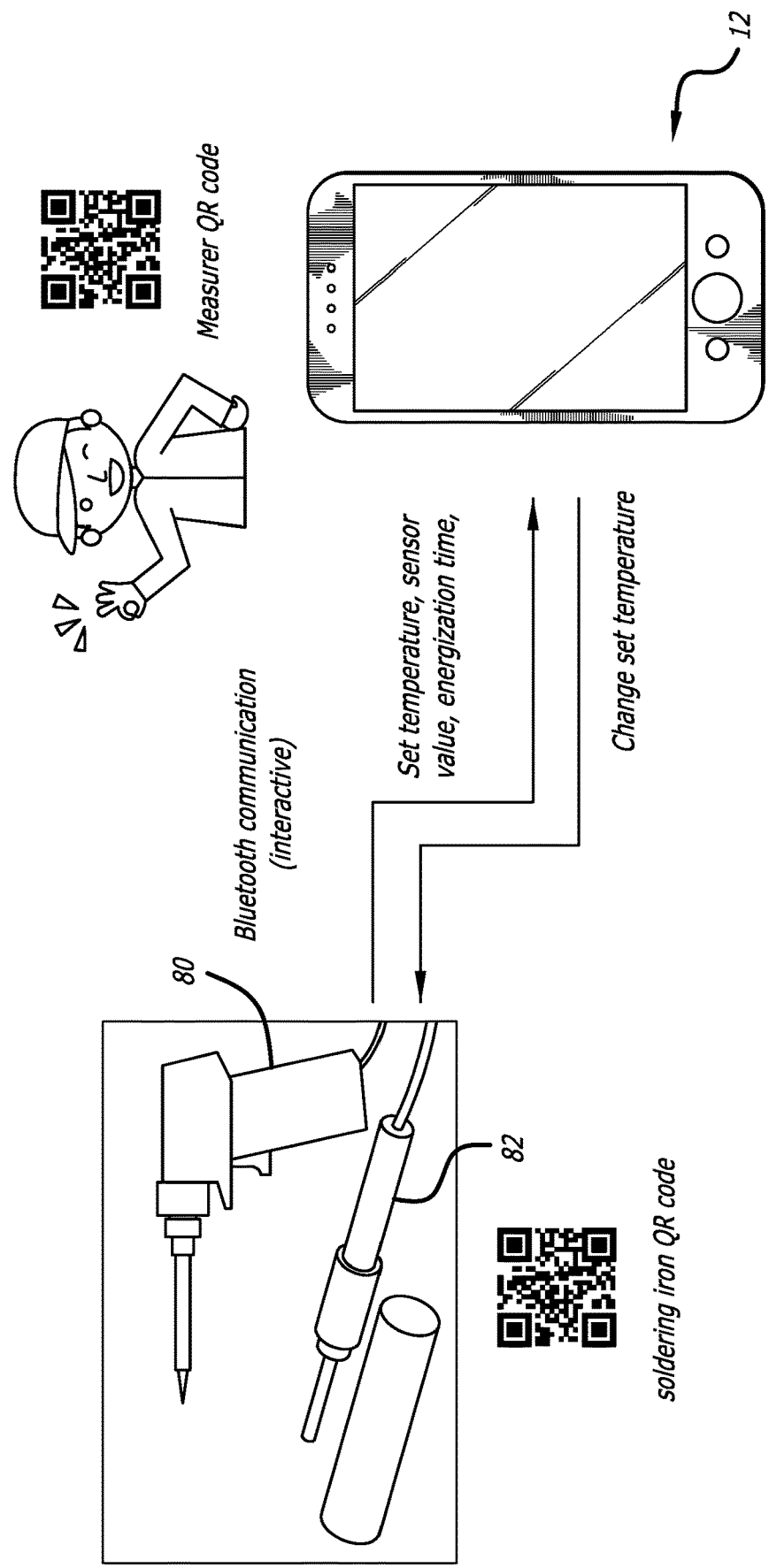
FIG. 3 provides a block and schematic depiction of AC powered soldering devices that may be controlled by the smart device controller of the present invention.

FIG. 3 provides a box diagram schematic depiction of the interaction of the smart device 12 with AC powered soldering devices that do not have the associated control station of FIGS. 1 and 2. The soldering devices of FIG. 3 may be a gun style soldering device 80 or a wand style soldering device 82. Each of the soldering devices 80, 82 include respective unique QR Codes that the smart device 12 may read to initiate the communication and control over the operation of the soldering devices 80, 82. FIG. 3 also depicts an animation of the user, and the user or the user's workstation may also have a QR Code that may be read by the smart device 12. After the smart device 12 reads the QR Code of the soldering device 80 or 82, the smart device 12 establishes a wireless communication link to the soldering device 80 or 82. Then the smart device 12 operates on the App program and displays a sequential set of information on the screen of the smart device 12 allowing the user to program the soldering device 80 or 82. For example, the user may operate the App of the smart device 12 to view the actual set temperature, tip temperature sensor values and energization interval, and change the set point temperature of the soldering device 80 or 82.

The smart device 12 can also utilize the App to scan the QR code of a thermometer 50, then use the temperature data measured by the thermometer 50 to check the actual tip temperature of the soldering device 80 or 82, compare the actual tip temperature to the set temperature and tip temperature sensor data, and determine if adjustments to the temperature settings are required for the particular soldering device 80 or 82 and associated cartridge 26 for a specified soldering operation.

Figure 4:
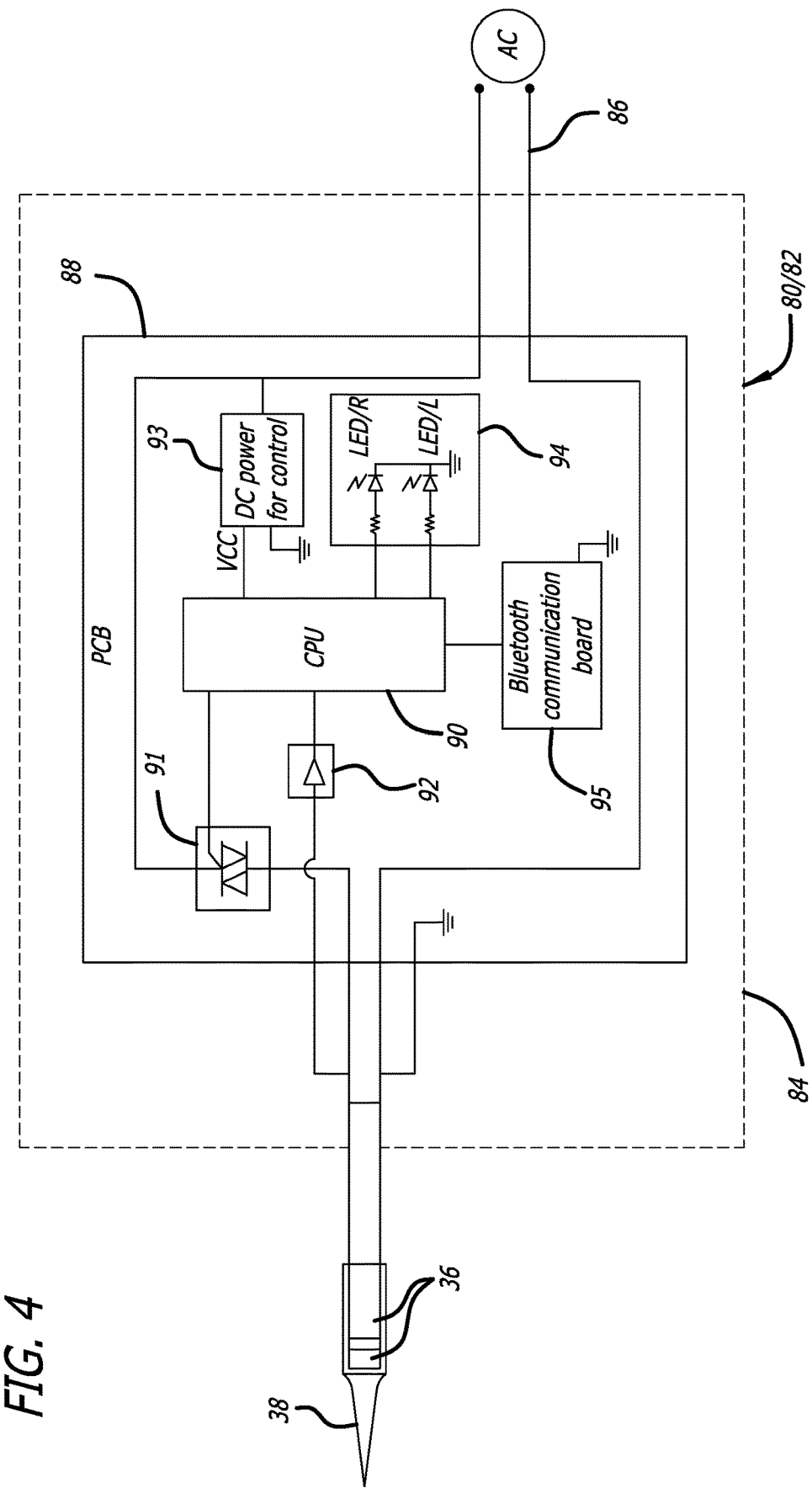
FIG. 4 provides a block and schematic depiction of the primary electronic components of the AC powered soldering devices of FIG. 3.

FIG. 4 provides a basic circuitry block diagram of the soldering devices 80 and 82 of FIG. 3. The soldering device comprises a holder or handle schematically represented by box 84. The handle is wired and configured to receive a cartridge 26 including an integrated heater/sensor 36 and a soldering tip 38. It should be appreciated that multiple different types of soldering cartridges may be used with the handle, and the cartridges can have multiple different configurations of the tip 38, including for example flat, pointed, wedge, beveled cone, rectangular and box shapes, to name a few. Each type of cartridge tip configuration may have unique powering requirements, and to properly power the cartridge 26 the soldering device 80 or 82 requires the capability of adapting the power output to obtain a desired tip temperature.

The circuitry within the handle 84 preferably includes a central processing unit (CPU) 90, which is connected to and controls a heater circuit 91, tip temperature circuit 92, an AC to DC power inverter circuit 93 a display circuit 94 and a wireless communication circuit 95. The heater circuit 91 is controlled by the CPU to supply power to the heater of the cartridge 26. The sensor circuit 92 monitors the resistance of the heater/sensor 36 of the cartridge to determine the tip temperature during operation of the soldering device. The AC to DC power inverter circuit 93 taps into the AC power supply to provide a rectified DC power to the CPU 90. The display circuit 94 may be a LED or liquid crystal display that is controlled by the CPU 94 to display data, for example on/off status, ready status, tip temperature setting and/or actual tip temperature data. The wireless communication circuit 95 connected to the CPU 90 is preferably a Bluetooth circuit, although it may be another type of wireless communication circuit including for example an infra-red or radio frequency communication circuit to interact with the smart device 12.

The CPU 90 preferably includes a temperature feedback control program that monitors the tip temperature provided by the sensor circuit 92, compares that measured tip temperature to the desired set point temperature, and adjusts the power provided by the heater circuit 91 to the heater/sensor 36 to establish the desired tip temperature. The wireless communication circuit 95 allows the CPU 90 to connect to the smart device 12 and obtain update instructions for the temperature setting and power level requirements of the cartridge 26 being used in the soldering process. This capability allows a user to make corrections to individual soldering devices 80 or 82. By way of example, if a user sets the desired tip temperature to 300° C., and the tip temperature circuit 92 provides an indication to the CPU 90 that the tip is operation at 300° C., the feedback loop of the CPU 90 will not adjust the power output to the heater of the cartridge. However, with repetitive use, the performance of the temperature sensor in the cartridge 26 may degrade, causing the CPU 90 to receive a temperature from the tip temperature circuit 92 that is lower (or higher) than the actual tip temperature, and the feedback loop of the CPU 90 will change the power output to the cartridge 26 to attempt to obtain the correct tip temperature. With the smart device 12 and the App of the present invention, the smart device 12 can read a tip temperature sensed by a thermometer 50, obtain the set point tip temperature from the CPU 90, and determine if the actual tip temperature as measured by the thermometer 50 matches the set point temperature provided by the CPU 90. If the smart device 12 identifies a difference between the actual tip temperature as measured by the thermometer 50 and the set point temperature provided by the CPU 90, the App of the smart device 12 allows the user to instruct the CPU 90 to adjust the power output to the cartridge 26 up or down, as appropriate, by a specific offset amount, to obtain the desired tip temperature. The CPU 90 may then retain the offset specification for future use of a specific cartridge 26. Continuing the example, if the thermometer 50 determines that the tip temperature is actually 290° C., the smart device 12 will instruct the CPU 90 to increase the power delivered to the cartridge 26 at a level required for a 10° C. upward adjustment.

Figure 5:
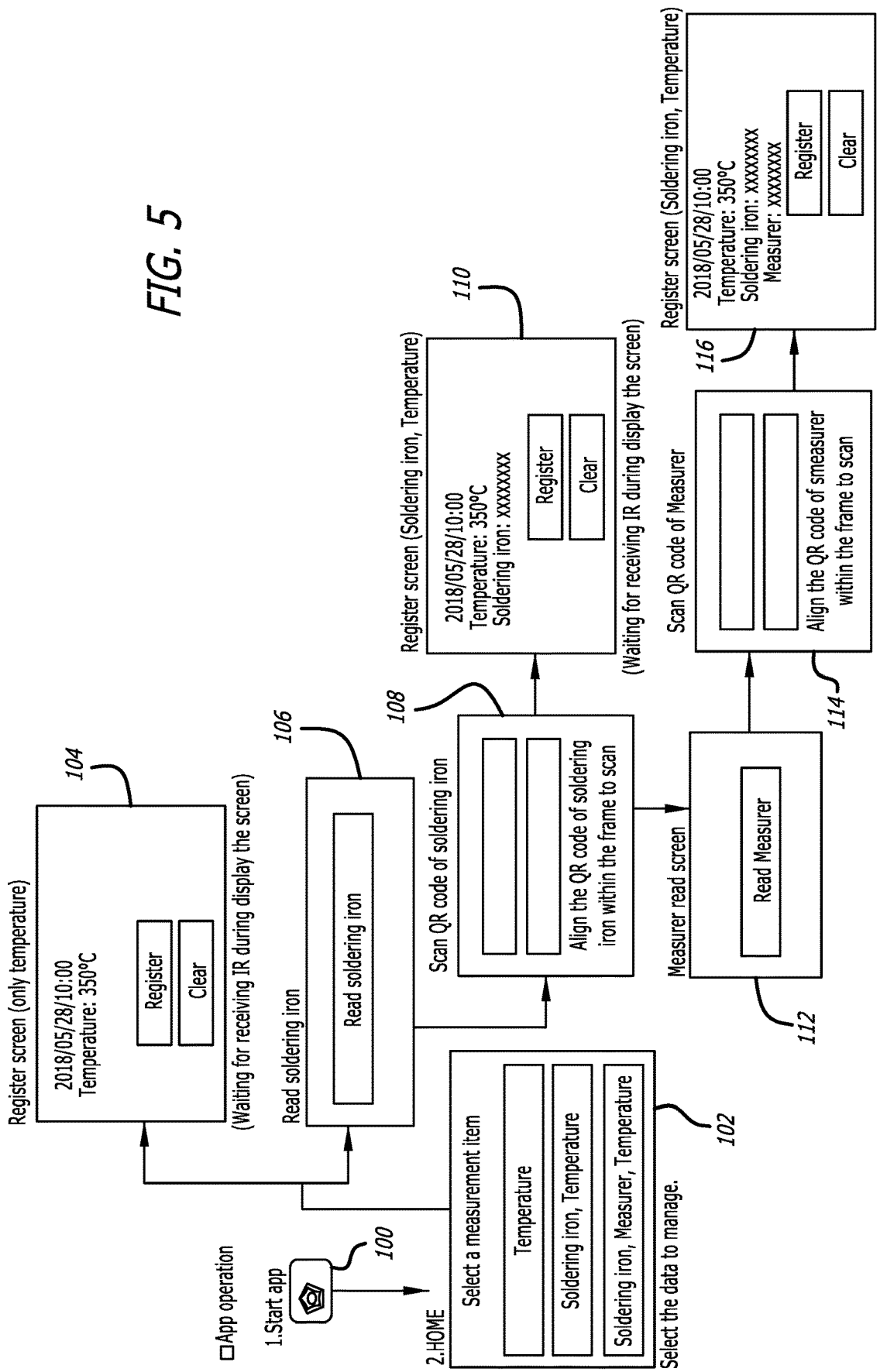
FIG. 5 depicts the progression of the screen displays generated within and by the program application (app) installed in the smart device of FIG. 1.

FIG. 5 depicts the progression of the screen displays generated within and by the program application (app) installed in the smart device 12. Initiation of the App in the smart device 12 is represented at block 100. When the App is initiated, the display of the smart device will display the data management options that the user may select to control or monitor the soldering device or soldering system as represented by home screen block 102. For example, the smart device may display an instruction "select a measurement item" and three option selections: "temperature;" "soldering iron, temperature;" and "soldering iron, measurer, temperature." Each option is highlighted and displayed in a manner whereby the user will be able to select the option using a touch screen feature of the smart device, or alternatively a mouse or keyboard feature. The user selects the option, and the display then proceeds to another display corresponding to the selected options "temperature" at block 104, or "read soldering iron" at block 106.

At the temperature block 104, the smart device 12 waits to receive a temperature reading from the thermometer 50. The temperature may be input to the smart device 12 via a wireless signal transmission from the thermometer 80, or via a wired connection to the thermometer 50. When the smart device 12 receives the temperature signal, the smart device 12 displays and records the temperature as well as the date and time of the measurement. The smart device 12 also displays a "register" and a "clear" icon allowing the user to select "register" to record the temperature measurement data (time and temperature) to a database within the smart device 12 or the host machine 40 of FIG. 1, or by selecting the "clear" icon the smart device 12 will clear the temperature data and accept another temperature measurement from the thermometer 50.

If the user selects either of the icons "soldering iron, temperature" or "soldering iron, measurer, temperature" at the home screen block 102, the smart device 12 proceeds to the "read soldering iron" block 106. At block 106, the user selects the "read soldering iron" icon causing the smart device 12 to proceed to a "scan QR Code" display as depicted at block 108. At the "scan QR Code" display, the smart device provides an instruction "align the QR Code of soldering iron within the frame to scan" and the smart device's camera is used to provide a display box above the instruction. When the user aligns the smart device's camera with a QR Code of a soldering device, the camera image is processed by the smart device 12 to read the QR Code and, by referencing a database of codes within the app, the smart device 12 identifies the particular soldering device or at least the type of soldering device.

If at the home screen the user had selected the "soldering, iron temperature" icon, then after reading the QR Code the program would continue to a register screen at block 110, where the smart device queries the thermometer 50 to obtain the temperature measurement for the scanned soldering device and displays the temperature together with the date and time information along with the device identifier obtained from the QR Code. At the register screen of block 110, the user can select from a "register" and a "clear" icon, to record the temperature, time and device data to a database within the smart device 12 or the host machine 40 of FIG. 1 with the "register" icon, or clear the temperature data to allow a new temperature measurement to be obtained upon activation of the "clear" icon. The user may also select a "home" icon to return the App to the home screen of block 102.

If at the home screen the user had selected the "soldering iron, measurer, temperature" icon, then from the scan QR code screen of block 108, the smart device 12 advances to a "measurer read screen" at block 112. At the "measurer read screen" the smart device 12 displays a "read measurer" icon. When the user selects the "read measurer" icon, the smart device 12 advances to a "scan QR code of measurer" screen as shown at block 114. At the "scan QR Code of measurer" display, the smart device 12 provides an instruction "align the QR Code of measurer within the frame to scan" and the smart device's camera is used to provide a display box above the instruction. When the user aligns the smart device's camera with a QR Code of the thermometer 50, or a QR Code associated with the user, the camera image is processed by the smart device 12 to read the QR Code and, by referencing a database of codes within the app, the smart device 12 identifies the particular thermometer 50 that measured the temperature of the soldering device. The smart device 12 then advances to another "register screen" at block 116. At that "register screen," the smart device displays the temperature, time and date of the measurement, the identifier of the soldering device and the identifier of the thermometer 50. The smart device's display also includes "register" and "clear" icons. By selecting the "register" icon, the temperature, time and date of the measurement, the identifier of the soldering device and the identifier of the thermometer 50 are recorded to a database within the smart device 12 or the host machine 40 of FIG. 1. By selecting the clear icon, the temperature measurement data is cleared, and the smart device will refresh the temperature data with a new reading from the thermometer 50. The smart device 12 may also include a "home" icon within the "register screen" to allow the user to return the smart device 12 to the home screen of block 102.

The App and programming of the smart device 12 allows a user of the soldering system to monitor performance of the soldering system, including most significantly the tip temperature data, to identify any defects are performance deterioration of the soldering system, and particularly the soldering tip which is most susceptible to wear and damage. The smart device 12 may also be used by a supervisor to monitor the performance of a number of different soldering devices within a work environment, to provide improved quality control and uniformity of soldering processes.

The foregoing description provides the base functionality of the App for the smart device. The present invention further contemplates increased functionality for the App to include the ability to control the operational parameters of the soldering device using the smart device 12, and to record and maintain operational use data for the respective components of the soldering system, in particular the soldering cartridge 26. The operational data may be stored within the smart device 12 or the host machine 40 of FIG. 1.

Figure 6:
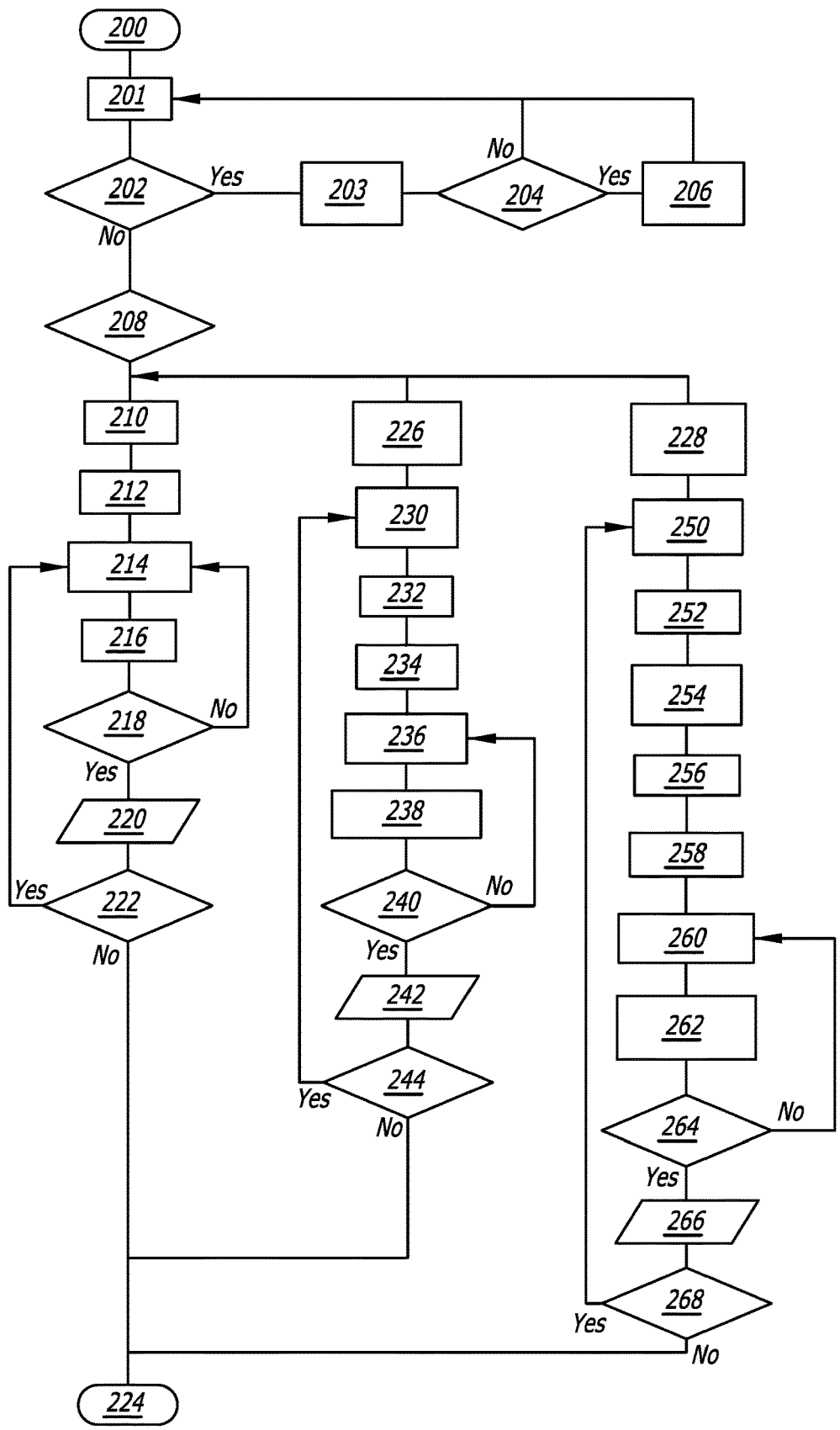
FIG. 6 is a program logic diagram for the software of the App that is stored on the smart device of FIGS. 1 and 2.

FIG. 6 provides a flow chart illustrating an exemplary program logic for the smart device app. The program depicted in the flow chart of FIG. 6 is initiated at the start block 200, when a user opens the soldering control App on the smart device 12. Upon activation, the App causes the smart device to launch a "home" screen at block 201. The program then proceeds to decision block 202 where the user is prompted on whether to set a measurement or not. If the user elects to set a measurement for the soldering device, the program proceeds to block 203 where the user is prompted to set the desired tip temperature and potentially a temperature range. After the user responds to the prompt, the program proceeds to decision block 204, where the user is presented with the option of identifying a measuring device. If the user declines, the program returns to the launch home screen block 201. If at step 204 the user elects to identify a measuring device, the program proceeds to step 206 where the program launches the QR Scan function to prompt the user to scan the QR Code of the measuring device, and then the program returns to the launch home screen block 201.

When the program is at decision block 202, and the user elects not to set a temperature, the program proceeds to the select modes screen of block 208. At the select modes screen of block 208, the user is prompted to select the devices to be controlled and the desired operations.

The select modes screen at box 208 then provides several icons allowing the user to select the desired operations that the App can provide. The App select screen 208 can display icons for "temperature;" "soldering iron, temperature;" and "soldering iron, measurer, temperature." The icon that the user selects determines whether the program proceeds to subroutines identified as start measurement temperature mode at block 210, start measurement temperature, manage soldering iron mode at block 226, or start measurement temperature, manage soldering iron, manage measurer mode at block 228.

If at select screen 208 the user selects: "temperature", the program advances to the start measurement temperature mode at block 210. After the tip temperature is determined, the program proceeds to a launch screen register mode at block 212. After the screen information has been registered, the program proceeds to a receive infrared tip temperature data mode at block 214. At that point, the smart device 12 queries the thermometer 50 to obtain an accurate tip temperature measurement. After obtaining the tip temperature data, the program proceeds to a display measured tip temperature mode at block 216, where the thermometer 50 tip temperature measurement is displayed to the user on the smart device 12. The program then proceeds to decision block 218, where the smart device 12 displays on option to register the temperature data. The user then determines if the temperature data should be saved. If the user decides not to save the data, the user declines the register invitation, the tip temperature measurement is cleared, and the program returns to block 214. If at decision block 218 the user accepts the register invitation, the program proceeds to a save data block 220, where the tip temperature measurement data is saved to the smart device 12 or a host machine (FIG. 1). After the data is saved, the program proceeds to decision block 222, where the user is prompted to make another temperature measurement (yes) or not (no). If the user selects yes, the program returns to block 214. If the user selects no, the program proceeds to an end App block 224, where the App is closed on the smart device 12.

If at select screen 208 the user selects: "soldering iron, temperature", the program advances to the start measurement temperature, manage soldering iron mode at block 226. When the user then enters the "soldering iron, temperature" subroutine, the program proceeds to the launch QR scan of soldering iron mode at block 230. At this point, the App causes the smart device to open its QR scan program, which prompts the user to identify the QR Code of the soldering device to the camera of the smart device 12, which then identifies the scanned QR Code to the program at block 232. The program then proceeds to the launch register screen at block 234 where the program establishes the communication link between the smart device 12 and the thermometer 50. Next the program proceeds to the receive infrared tip temperature at block 236, where the smart device 12 receives the temperature measurement signal from the thermometer 50. Then the program proceeds to the display measured temperature and soldering iron code mode at block 238. The App displays the measured temperature and the code identifying the particular soldering device on the smart device 12. The user is then prompted to register the data at decision block 240. If the user decides not to register the data, then the program returns to block 236. If the user elects to register the data, then the program proceeds to a save data and add data to log file at block 242, where the temperature data and corresponding soldering device data obtained at block 238 are saved to a memory in the smart device 12 or a host machine 40 (FIG. 1). After the data is saved at block 242, the program proceeds to a decision measure again block 244. The user then elects to make another measurement, in response to which the program returns to block 230, or the user elects not to make another measurement and the program proceeds to the end App block 224.

If at select screen 208 the user selects: "soldering iron, measurer, temperature" the program advances to the start measurement temperature, manage soldering iron, manage measurer mode at block 228. When the user then enters the "soldering iron, measurer, temperature" subroutine, the program proceeds to the launch QR scan of soldering iron mode at block 250. At this point, the App causes the smart device to open its QR scan program, which prompts the user to identify the QR Code of the soldering device to the camera of the smart device 12, which then identifies the scanned QR Code to the program at block 252. The program then proceeds to the launch QR scan of measurer at block 254. At this point, the App causes the smart device to open its QR scan program again, prompts the user to identify the QR Code of the measurer, a QR Code associated the user or a particular work station, to the camera of the smart device 12, which then identifies the scanned QR Code to the program at block 256. After the QR Codes are scanned, the program proceeds to the launch register screen at block 258, where the program establishes the communication link between the smart device 12 and the thermometer 50. Next the program proceeds to the receive infrared tip temperature at block 260, where the smart device 12 receives the temperature measurement signal from the thermometer 50. Then the program proceeds to the display measured temperature, soldering iron code and measurer code at block 262. The App displays the measured temperature and the code identifying the particular soldering device as well as the code associated with the measurer (the user or the user's work station) on the smart device 12. The user is then prompted to register the data at decision block 264. If the user decides not to register the data, then the program returns to block 260. If the user elects to register the data, then the program proceeds to a save data and add data to log file at block 266, where the temperature data and corresponding soldering device data and measurer data are saved to a memory in the smart device 12 or a host machine 40 (FIG. 1). After the data is saved at block 266, the program proceeds to a decision measure block 268. The user then elects to make another measurement, in response to which the program returns to block 250, or the user elects not to make another measurement and the program proceeds to the end App block 224.

Figure 7:
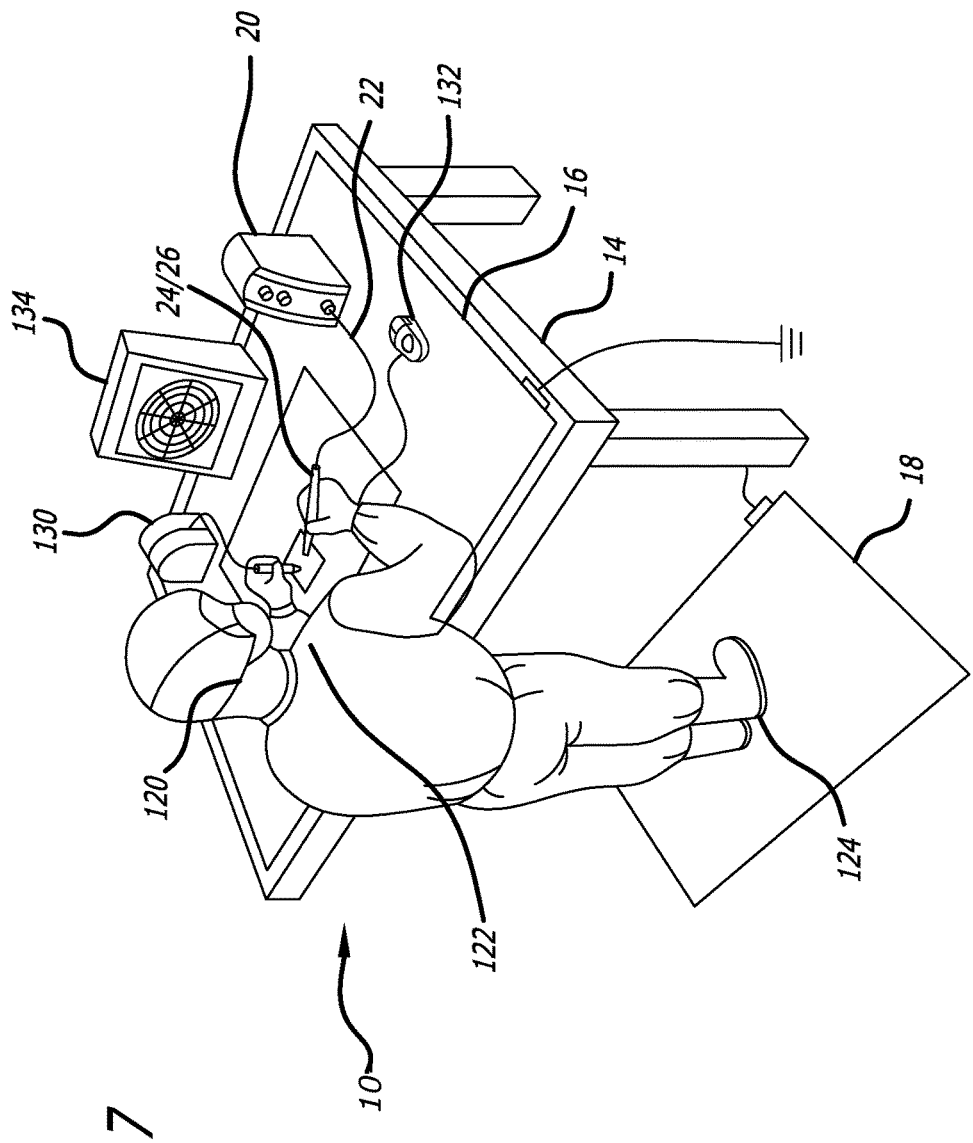
FIG. 7 provides a block and schematic depiction of a soldering station with safety elements all communicating with a smart device controller according to an enhanced version of the present invention.

FIG. 7 depicts a soldering system 10 at a workstation equipped with electrostatic discharge (ESD) safety equipment. The workstation includes a table 14 with an ESD safe work-mat 16 and ESD safe floor-mat 18. The soldering system 10 at the workstation includes the control station 20, cable assembly 22, handle 24 with a cartridge 26 as discussed above with respect to FIG. 1. On the workstation, the work-mat 16 and the floor-mat 18 are electrically connected to an electrical ground. The user of the soldering system 10 is depicted wearing ESD safe clothing 120, as well as wearing a wrist strap 122 and antistatic shoes 124. In addition to the control station 20, a combination thermometer, tip to ground resistance and leak voltage detector device 130 as well as a tester for wrist strap 132 and an ionizer fan 134 are depicted on the table 14. The thermometer, tip to ground resistance and leak voltage detector device 130 as well as the tester for wrist strap 132 will have a QR Code as well as be upgraded to be equipped with a wireless communication circuit for use with the App and programs of the present invention, as discussed below with respect to the program logic flow charts of FIGS. 8 and 9.

Figure 8:
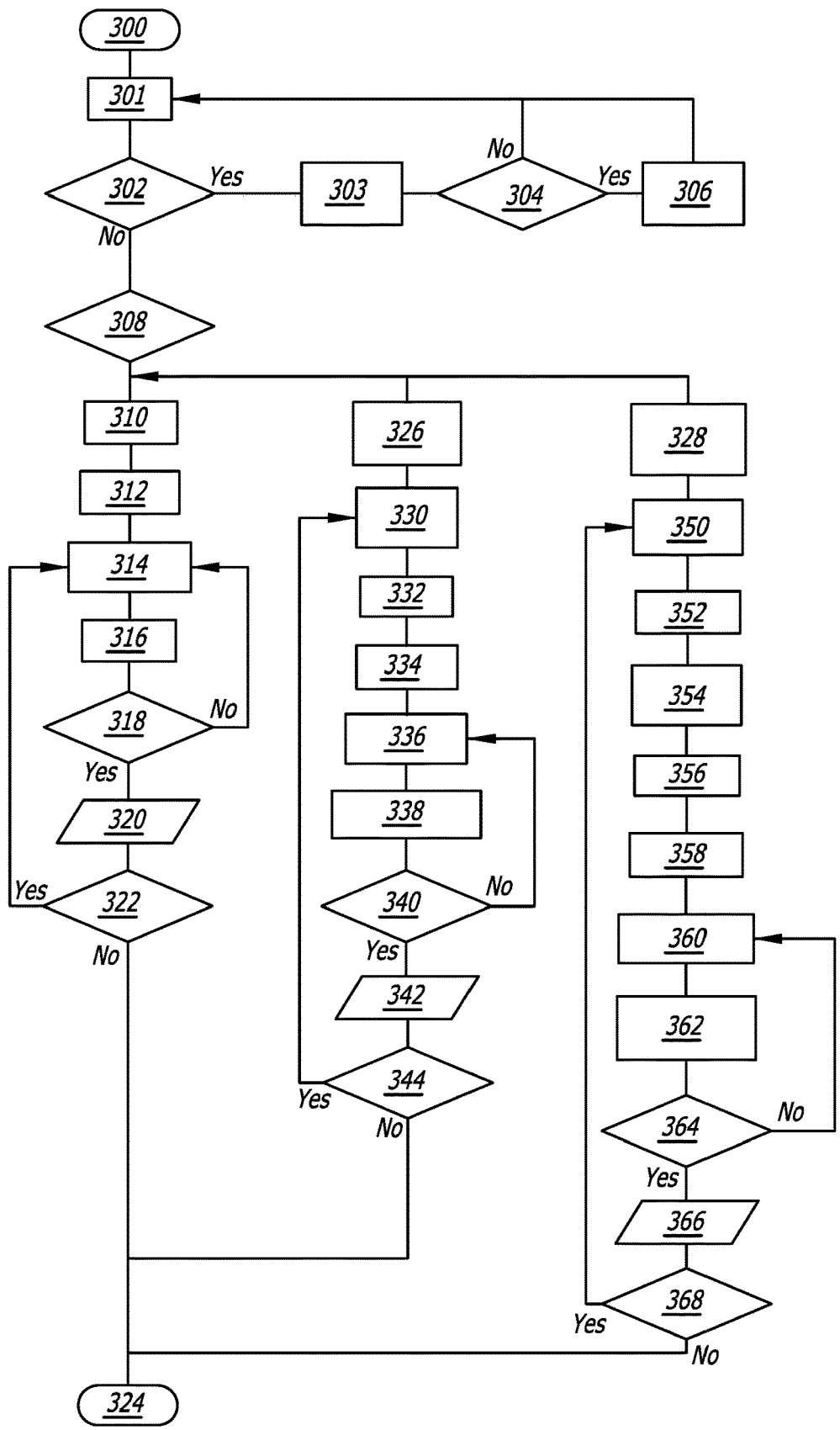
FIG. 8 is a program logic diagram for the software of the App that is stored on the smart device of FIGS. 1 and 2.

FIG. 8 provides a flow chart illustrating an additional program logic for the smart device app to work with the ESD safe soldering system and the wrist strap safety devices of FIG. 7. The program depicted in the flow chart of FIG. 8 is initiated at the start block 300, when a user opens the soldering control App on the smart device 12. Upon activation, the App causes the smart device to launch a "home" screen at block 301. The program then proceeds to decision block 302 where the user is prompted to set a measurement or not. If the user elects to set a measurement of the grounding resistance, the program proceeds to block 303 where the user is prompted to set the desired grounding resistance. After the user responds to the prompt, the program proceeds to decision block 304, where the user is presented with the option of identifying a measuring device. If the user declines, the program returns to the launch home screen block 301. If at step 304 the user elects to identify a measuring device, the program proceeds to step 306 where the program launches the QR Scan function to prompt the user to scan the QR Code of the measuring device, and then the program returns to the launch home screen block 301.

When the program is at decision block 302 and the user elects not to set a measurement, the program proceeds to the select modes screen of block 308. At the select modes screen of block 308, the user is prompted to select the desired operations. In this selection process, the smart device 12 establishes a communication link to the tester for wrist strap 132.

The select modes screen at box 308 then provides several icons allowing the user to select the desired additional operations that the App can provide. The App select screen 308 can display icons for "manage grounding resistance;" "manage grounding resistance, manage wrist strap;" and "manage grounding resistance, manage wrist strap, manage user." The icon that the user selects determines whether the program proceeds to subroutines identified as start manage grounding resistance at block 310; start manage grounding resistance, manage wrist strap at block 326 or start manage grounding resistance, manage wrist strap, manage user at block 328.

If at select screen 308 the user selects: "manage grounding," the program advances to the start manage grounding resistance mode at block 310. The program then proceeds to a launch register screen mode at block 312. After the screen information has been registered, the program proceeds to a receive infrared measurement data from the tester for wrist strap 132 at block 314. At that point, the smart device 12 queries the tester for wrist strap 132 to obtain the grounding resistance. After obtaining the grounding resistance, the program proceeds to a display measured value screen at block 316, where the resistance is displayed to the user on the smart device 12. The program then proceeds to decision block 318, where the smart device 12 displays on option to register the grounding resistance. The user then determines if the resistance data should be saved. If the user decides not to save the data, the user declines the register invitation, the grounding resistance measurement is cleared, and the program returns to block 314. If at decision block 318 the user accepts the register invitation, the program proceeds to a save data block 320, where the grounding resistance data is saved to the smart device 12 or a host machine (FIG. 1). After the data is saved, the program proceeds to decision block 322, where the user is prompted to make another measurement (yes) or not (no). If the user selects yes, the program returns to block 314. If the user selects no, the program proceeds to an end App block 324, where the App is closed on the smart device 12.

If at select screen 308 the user selects: "manage grounding resistance, manage wrist strap", the program advances to the start manage grounding resistance, manage wrist strap mode at block 326. When the user then enters the start manage grounding resistance, manage wrist strap subroutine, the program proceeds to the launch QR scan of wrist strap mode at block 330. At this point, the App causes the smart device to open its QR scan program, which prompts the user to identify the QR Code of the wrist strap to the camera of the smart device 12, which then identifies the scanned QR Code to the program at block 332. The program then proceeds to the launch register screen at block 334 where the program establishes the communication link between the smart device 12 and the tester for wrist strap 132. Next the program proceeds to the receive infrared measurement data from tester at block 336, where the smart device 12 receives the grounding resistance data from the tester for wrist strap 132. Then the program proceeds to the display resistance and wrist strap code mode at block 338. The App displays the measured resistance and the code identifying the particular wrist strap 122 on the smart device 12. The user is then prompted to register the data at decision block 340. If the user decides not to register the data, the data is cleared and then the program returns to block 336. If the user elects to register the data, then the program proceeds to a save data and add data to log file at block 342, where the grounding resistance and corresponding wrist strap data obtained at block 338 are saved to a memory in the smart device 12 or a host machine 40 (FIG. 1). After the data is saved at block 342, the program proceeds to a decision measure again block 344. The user then elects to make another measurement, in response to which the program returns to block 330, or the user elects not to make another measurement and the program proceeds to the end App block 324.

If at select screen 308 the user selects: "manage grounding resistance, manage wrist strap, manage user" the program advances to the start manage grounding resistance, manage wrist strap, manage user mode at block 328. When the user then enters the "manage grounding resistance, manage wrist strap, manage user" subroutine, the program proceeds to the launch QR scan of the wrist strap at block 350. At this point, the App causes the smart device to open its QR scan program, which prompts the user to identify the QR Code of the wrist strap to the camera of the smart device 12, which then identifies the scanned QR Code to the program at block 352. The program then proceeds to the launch QR scan of worker or user at block 354. At this point, the App causes the smart device to open its QR scan program again, prompts the user to identify the QR Code of the worker or user, a QR Code associated the user or a particular work station, to the camera of the smart device 12, which then identifies the scanned QR Code to the program at block 356. After the QR Codes are scanned, the program proceeds to the launch register screen at block 358, where the program establishes the communication link between the smart device 12 and the tester for wrist strap 132. Next the program proceeds to the receive grounding resistance at block 360, where the smart device 12 receives the infrared grounding resistance data signal from the tester for wrist strap 132. Then the program proceeds to the display resistance, wrist strap code and user code on the smart device 12 at block 362. The user is then prompted to register the data at decision block 364. If the user decides not to register the data, the data is cleared and then the program returns to block 360. If the user elects to register the data, then the program proceeds to a save data and add data to log file at block 366, where the resistance, wrist strap code and user code data are saved to a memory in the smart device 12 or a host machine 40 (FIG. 1). After the data is saved at block 366, the program proceeds to a decision measure block 368. The user then elects to make another measurement, in response to which the program returns to block 350, or the user elects not to make another measurement and the program proceeds to the end App block 324. It may be appreciated that this program associated with the monitoring of the wrist strap 122 may be modified to monitor the antistatic shoes 124, the work-mat 16 or the floor-mat 18 of FIG. 7.

Figure 9:
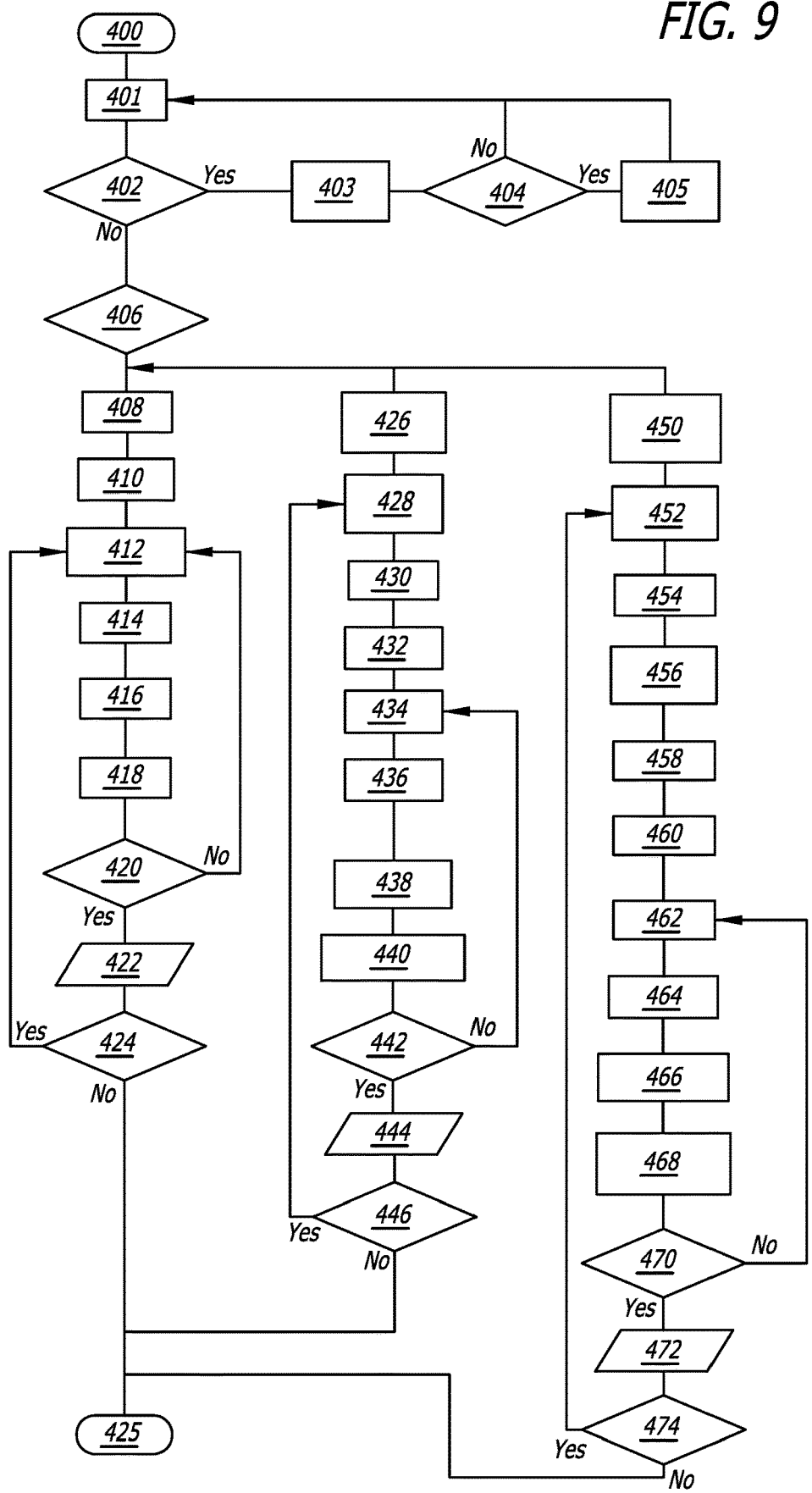
FIG. 9 is a program logic diagram for the software of the App that is stored on the smart device of FIGS. 1 and 2.

FIG. 9 provides a flow chart illustrating another additional program logic for the smart device app to work with the thermometer, tip to ground resistance and leak voltage detector device 130 safety device of FIG. 7. The program depicted in the flow chart of FIG. 9 is initiated at the start block 400, when a user opens the soldering control App on the smart device 12. Upon activation, the App causes the smart device to launch a "home" screen at block 401. The program then proceeds to decision block 402 where the user is prompted to set a temperature or measurement. If the user elects to set a temperature or measurement of the soldering device, the program proceeds to block 403 where the user is prompted to set the desired tip temperature, the range of tip temperatures, a maximum leak voltage and a maximum tip to ground resistance value. After the user responds to the prompt, the program proceeds to decision block 404, where the user is presented with the option of identifying the measuring device. If the user declines, the program returns to the launch home screen block 401. If at step 404 the user elects to identify a measuring device, for example the thermometer, tip to ground resistance and leak voltage detector device 130, the program proceeds to step 405 where the program launches the QR Scan function to prompt the user to scan the QR Code of the measuring device, and then the program returns to the launch home screen block 401.

When the program is at decision block 402 and the user elects not to set a measurement, the program proceeds to the select modes screen of block 406. At the select modes screen of block 406, the user is prompted to select the desired operations. In this selection process, the smart device 12 establishes a communication link to the thermometer, tip to ground resistance and leak voltage detector device 130.

The select modes screen at decision lock 406 then provides several icons allowing the user to select the desired additional operations that the App can provide. The App select screen 308 can display icons for "measure temperature;" "measure temperature, manage iron;" and "measure temperature, manage iron, manage measurer." The icon that the user selects determines whether the program proceeds to subroutines identified as start measure temperature at block 408; start measure temperature, manage iron at block 426 or start measure temperature, manage iron, manage measurer at block 450.

If at select screen 406 the user selects: "measure temperature," the program advances to the start measure mode at block 408. The program then proceeds to a launch register screen mode at block 410. After the screen information has been registered, the program proceeds to a receive infrared tip temperature mode at block 412. At that point, the smart device 12 queries the thermometer, tip to ground resistance and leak voltage detector device 130 to obtain the tip temperature. After obtaining the tip temperature, the program proceeds to query the thermometer, tip to ground resistance and leak voltage detector device 130 to obtain the leak voltage measurement at block 414. Next, the program proceeds to query the thermometer, tip to ground resistance and leak voltage detector device 130 to obtain the tip to ground resistance at block 416. After obtaining the three measurements, the program proceeds to display block 418, causing the smart device 12 to display the measured tip temperature, leak voltage and tip to ground resistance. The program then proceeds to decision block 420, where the smart device 12 displays on option to register the data. The program judges if the three measurements are within the predetermined range or not. If the measurements are not within the predetermined range, the program returns to block 412. If the measurements are within the predetermined range, the program proceeds to a save data block 422, where the tip temperature data, leak voltage data and tip to ground resistance data are saved to the smart device 12 or a host machine (FIG. 1). After the data is saved, the program proceeds to decision block 424, where the user is prompted to make another measurement (yes) or not (no). If the user selects yes, the program returns to block 412. If the user selects no, the program proceeds to an end App block 425, where the App is closed on the smart device 12.

If at select screen 406 the user selects: "measure temperature, manage iron", the program advances to the start measure temperature, manage iron mode at block 426. When the user then enters the start measure temperature, manage iron subroutine, the program proceeds to the launch QR scan of soldering iron mode at block 428. At this point, the App causes the smart device to open its QR scan program, which prompts the user to identify the QR Code of the soldering iron to the camera of the smart device 12, which then identifies the scanned QR Code to the program at block 430. The program then proceeds to the launch register screen at block 432 where the program establishes the communication link between the smart device 12 and the thermometer, tip to ground resistance and leak voltage detector device 130. Next the program proceeds to the receive tip temperature measurement data from the thermometer, tip to ground resistance and leak voltage detector device 130 at block 434, where the smart device 12 receives the tip temperature data. The program then proceeds to block 436 to receive the soldering iron leak voltage data from the thermometer, tip to ground resistance and leak voltage detector device 130. Then the program advances to block 438 to receive the tip to ground resistance data from the tip to ground resistance measuring device 132. Then the program proceeds to the display data block 440, where the program causes the smart device 12 to display the data obtained in blocks 434, 436 and 438. The user is then prompted to register the data at decision block 442. The program judges if the three measurements are within the predetermined range or not. If the measurements are not within the predetermined range, the program returns to block 412. If the measurements are within the predetermined range, then the program proceeds to a save data and add data to log file at block 444, where the tip temperature, leak voltage and tip to ground resistance are saved to a memory in the smart device 12 or a host machine 40 (FIG. 1). After the data is saved at block 444, the program proceeds to a decision measure again block 446. The user then elects to make another measurement, in response to which the program returns to block 428, or the user elects not to make another measurement and the program proceeds to the end App block 425.

If at select screen 406 the user selects: "measure temperature, manage iron, manage measurer" the program advances to the start measure temperature, manage iron, manage measurer mode at block 450. When the user then enters the "measure temperature, manage iron, manage measurer" subroutine, the program proceeds to the launch QR scan of the soldering iron at block 452. At this point, the App causes the smart device to open its QR scan program, which prompts the user to identify the QR Code of the soldering iron to the camera of the smart device 12, which then identifies the scanned QR Code to the program at block 454. The program then proceeds to the launch QR scan of measurer at block 456. At this point, the App causes the smart device to open its QR scan program again, prompts the user to identify the QR Code of the measuring device, for example the thermometer, tip to ground resistance and leak voltage detector device 130, to the camera of the smart device 12, which then identifies the scanned QR Code to the program at block 458. After the QR Codes are scanned, the program proceeds to the launch register screen at block 460, where the program establishes the communication link between the smart device 12 and the thermometer, tip to ground resistance and leak voltage detector device 130.

Next the program proceeds to the receive tip temperature measurement data from the thermometer, tip to ground resistance and leak voltage detector device 130 at block 462, where the smart device 12 receives the tip temperature data. The program then proceeds to block 464 to receive the soldering iron leak voltage data from the thermometer, tip to ground resistance and leak voltage detector device 130. Then the program advances to block 466 to receive the tip to ground resistance data from the thermometer, tip to ground resistance and leak voltage detector device 130. Then the program proceeds to the display data block 468, where the program causes the smart device 12 to display the data obtained in blocks 462, 464 and 466. The user is then prompted to register the data at decision block 470. The program judges if the three measurements are within the predetermined range or not. If the measurements are not within the predetermined range, the program returns to block 462. If the measurements are within the predetermined range, then the program proceeds to a save data and add data to log file at block 472, where the tip temperature, leak voltage and tip to ground resistance are saved to a memory in the smart device 12 or a host machine 40 (FIG. 1). After the data is saved at block 472, the program proceeds to a decision measure again block 474. The user then elects to make another measurement, in response to which the program returns to block 452, or the user elects not to make another measurement and the program proceeds to the end App block 425.

The foregoing descriptions of the logic of the programs for the App are provided as exemplary descriptions of the capabilities of a control App directing the interaction as between a smart device 12 and a soldering system or soldering device having a wireless communication circuit and the capability of interacting with the smart device to be controlled by the App on the smart device. It should be appreciated that the invention contemplates alternative logic routines to accomplish the same results, as well as modifications to allow additional functionality.

For example, the invention contemplates an enhanced program and alternatives to the subroutines described above. For example, while as described above, the App at select screen 208 displays icons for "temperature;" "soldering iron, temperature;" and "soldering iron, measurer, temperature", as an enhancement to the program described above, the App can be programmed to cause the select screen 208 to display additional icons, for example: "temperature setting;" "register work station;" "manage soldering devices;" and "tutorial." In the enhancement program, at the select screen 208 decision block, the sub-program that is initiated depends upon which icon the user selects.

If the user selects the "temperature setting" icon at select screen 208, the program advances to a "temperature setting" subroutine. If the user selects the "register work station" icon at select screen 208, the program advances to a "register work station" subroutine. If the user selects the "manage soldering devices" icon at select screen 208, the program advances to a "manage soldering devices" subroutine. If the user selects the "tutorial" icon at select screen 208, the program advances to a "tutorial" subroutine.

When the user selects "temperature setting" subroutine, the smart device 12 queries the control station 20, or the soldering device 80 or 82 if there is no control station, to identify the cartridge and the set temperature of the cartridge. The smart device 12 may then acquires the actual temperature data provided by thermometer 50, to compare the actual temperature to the set temperature and measured tip temperature. If no adjustment is necessary, then the user can initiate a "home" icon to return to the home screen 201. However, if the user decides to set a new temperature, the smart device displays a "set temp" icon which when initiated causes the program to proceed to "select temperature" display screen. At that point the user can select or adjust the desired tip temperature on the smart device display. Upon selection of the desired temperature, the smart device sends a temperature change signal to the control station 20 or soldering device 80, 82. Upon receipt of a confirmation of the temperature change from the control station 20 or soldering device 80 or 82, the smart device displays the new set temperature. The smart device 12 then again queries the thermometer 50 to determine if the actual temperature is approximately equal to the desired set temperature. If not, then the program repeats the above described steps of displaying the "set temp" icon and the user may proceed to the "select temperature" routine. If the actual temperature is approximately equal to the desired set temperature, the smart device proceeds to a temperature change completion screen, allowing the user to elect to return to the home screen 201.

Alternatively, when the user selects "temperature setting" subroutine program step 203, the smart device queries the control station, or the soldering device if there is no control station, to identify the cartridge and then the user can select the desired tip temperature on the smart device. Upon selection of the desired temperature, the smart device sends a temperature change signal to the control station or directly to the soldering iron.

When at the home screen block 201, the user selects a "register work station" subroutine, the smart device 12 queries the control station 20 or soldering device 80, 82 to identify the control station or soldering device and display the identification information on the smart device 12, and display "register work station" to the user. The App then causes the smart device 12 to display a "read QR Code" instruction and accesses QR code reader program of the smart device 12 and the camera of the smart device 12 to initiate a display prompting the user to read a QR Code. The user then aligns the camera to a QR Code to be read and selects a corresponding icon for a cartridge, a work station or user/operator, each of which have their own unique QR Code. The smart device 12 then displays all of the QR Code data to the user, and a user may then select either a "store" or "clear" icon to cause the smart device to either store the information concerning the control station, cartridge, work station and operator, or clear the information and return to the home screen 201.

When at the home screen block 201, the user selects "manage soldering devices" subroutine, the smart device App launches the "manage soldering devices" subroutine. The program subroutine causes the smart device 12 to enter a data acquisition and retention process. The smart device 12 then displays the identification number or numbers of the soldering devices or soldering systems within the wireless connectivity range that may be queried by the smart device 12. The user then selects from the identified devices the specific device to be controlled, and the program moves to a "record data" display. At that point, the smart device instructs the selected control station or soldering device to upload specified data, for example cartridge ID, cartridge type, set point temperatures, soldering cycle times, number of soldering events and any other type of data that may be stored in either the control station 20 or stored within a memory associated with the particular soldering device 80 or 82. When the data has been uploaded to smart device 12, the App will cause the display of icons for each of the functions "save;" "upload;" and "clear". The "save" icon causes the data to be saved on the smart device 12. The "upload" icon causes the data to be uploaded to the host machine 40 (FIG. 1). The "clear" icon causes the data to be cleared and the program to return to the home screen at block 201.

When at the home screen block 201, the user selects "tutorial" subroutine, the smart device App launches the "tutorial" subroutine which begins by having the smart device query the control station to identify control station, or the soldering device to identify a particular type of soldering device, and identify the type of cartridge that is being powered as well as its set temperature, so that the program can display a "tutorial" screen providing the user with information options for the particular type of soldering system or soldering device, to teach the user proper soldering techniques, temperatures for the particular cartridge. For example, the App program may cause the smart device to display the information identifying the soldering station, cartridge and set temperature, and provides icons for the user to select useful information. For example, the icons may be "instructional video;" "tip shape uses;" "solder photos;" "operation set points;" and "work history." When the user selects one of the tutorial icons, the App will cause the smart device 12 to pull data, images or video either from a memory or from an internet or intranet system, to display on the smart device.

The invention has been described in detail above in connection with the figures, however it should be understood that the system may include other components and enable other functions. Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:

1. An application control program implemented on a smart device to establish a wireless communication link to a measuring device component of a soldering system the measuring device is a thermometer obtaining temperature measurements of a soldering tip of a soldering iron,
  wherein the step of causing the smart device to display operational parameters of the thermometer further comprises:
  causing the smart device to display icons associated with "temperature;" "soldering iron, temperature;" and "soldering iron, measurer, temperature" subroutines, and prompting the user to launch a selected subroutine to be recorded, modified or erased, by at least one of:
    causing the smart device to display an icon for "temperature" and prompting the user to select the subroutine to start a measurement temperature subroutine and upon the user selecting the temperature subroutine, the program causes the smart device to start a measurement temperature mode and determine the tip temperature of the soldering tool, display the tip temperature to the user, and prompt the user to record or erase the tip temperature measurement;
    causing the smart device to display an icon for "soldering iron, temperature" and prompting the user to select the subroutine to start a measurement temperature, manage soldering iron subroutine, and upon the user selecting the soldering iron, temperature subroutine, the program causes the smart device to start a measurement temperature mode to obtain the tip temperature of the soldering tool, prompt the user to scan an identification code associated with the soldering tool and prompt the user to record or erase the tip temperature measurement associated with the identified soldering tool, and
    causing the smart device to display an icon for "soldering iron, measurer, temperature" and prompting the user to select the subroutine identified to start a measurement temperature, manage soldering iron, manage measurer subroutine, and upon the user selecting the soldering iron, measurer, temperature subroutine, the program causes the smart device to start a measurement temperature mode to obtain the tip temperature of the soldering tool, prompt the user to scan an identification code associated with the soldering tool and prompts the user to scan an identification code associated with the user or the user's work station, and prompt the user to record or erase the tip temperature measurement associated with the identified soldering tool and user or work station.

2. The application program of claim 1, the program further comprising the steps of;
accepting a user input set high and low range of tip temperatures; and
causing the smart device to judge if the tip temperature of the soldering tool is within the range set by the user.

3. An application control program implemented on a smart device to establish a wireless communication link to a measuring device component of a soldering system, the measuring device is a thermometer obtaining temperature measurements of a soldering tip of a soldering iron, the program comprising the steps of:
causing the smart device to display operational parameters of the thermometer measuring device including display icons associated with "temperature;" "soldering iron, temperature;" and "soldering iron, measurer, temperature" subroutines, and prompting the user to launch a selected subroutine;
causing the smart device to prompt the user to select an operational parameter of the measuring device to be recorded, modified or erased, wherein the step of causing the smart device to prompt the user to select an operational parameter of the soldering tool to be recorded, modified or erased further comprises causing the smart device to display an icon for "temperature" and prompting the user to select the subroutine to start a measurement temperature subroutine; and
upon the user selecting the temperature subroutine, the program causes the smart device to start a measurement temperature mode and determine the tip temperature of the soldering tool, display the tip temperature to the user, and prompt the user to record or erase the tip temperature measurement.

4. An application control program implemented on a smart device to establish a wireless communication link to a measuring device component of a soldering system, the measuring device is a thermometer obtaining temperature measurements of a soldering tip of a soldering iron, the program comprising the steps of:
causing the smart device to display operational parameters of the thermometer measuring device including display icons associated with "temperature;" "soldering iron, temperature;" and "soldering iron, measurer, temperature" subroutines, and prompting the user to launch a selected subroutine;
causing the smart device to prompt the user to select an operational parameter of the measuring device to be recorded, modified or erased, wherein the step of causing the smart device to prompt the user to select an operational parameter of the soldering tool to be recorded, modified or erased further comprises causing the smart device to display an icon for "soldering iron, temperature" and prompting the user to select the subroutine to start a measurement temperature, manage soldering iron subroutine; and
upon the user selecting the soldering iron, temperature subroutine, the program causes the smart device to start a measurement temperature mode to obtain the tip temperature of the soldering tool, prompt the user to scan an identification code associated with the soldering tool and prompt the user to record or erase the tip temperature measurement associated with the identified soldering tool.

5. An application control program implemented on a smart device to establish a wireless communication link to a measuring device component of a soldering system, the measuring device is a thermometer obtaining temperature measurements of a soldering tip of a soldering iron, the program comprising the steps of:
causing the smart device to display operational parameters of the thermometer measuring device including display icons associated with "temperature;" "soldering iron, temperature;" and "soldering iron, measurer, temperature" subroutines, and prompting the user to launch a selected subroutine;
causing the smart device to prompt the user to select an operational parameter of the measuring device to be recorded, modified or erased, wherein the step of causing the smart device to prompt the user to select an operational parameter of the soldering tool to be recorded, modified or erased further comprises causing the smart device to display an icon for "soldering iron, measurer, temperature" and prompting the user to select the subroutine identified to start a measurement temperature, manage soldering iron, manage measurer subroutine; and
upon the user selecting the soldering iron, measurer, temperature subroutine, the program causes the smart device to start a measurement temperature mode to obtain the tip temperature of the soldering tool, prompt the user to scan an identification code associated with the soldering tool and prompts the user to scan an identification code associated with the user or the user's work station, and prompt the user to record or erase the tip temperature measurement associated with the identified soldering tool and user or work station.

* * * * *